United States Patent
Matsuno

(10) Patent No.: US 9,623,869 B2
(45) Date of Patent: Apr. 18, 2017

(54) VEHICLE DRIVING SUPPORT CONTROL APPARATUS

(71) Applicant: FUJI JUKOGYO KABUSHIKI KAISHA, Tokyo (JP)

(72) Inventor: Koji Matsuno, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/086,642

(22) Filed: Nov. 21, 2013

(65) Prior Publication Data

US 2014/0149013 A1  May 29, 2014

(30) Foreign Application Priority Data

Nov. 28, 2012 (JP) ................................. 2012-260122

(51) Int. Cl.
| | |
|---|---|
| *B60W 30/09* | (2012.01) |
| *B60W 30/095* | (2012.01) |
| *B60R 21/00* | (2006.01) |
| *B60T 7/12* | (2006.01) |
| *G08G 1/16* | (2006.01) |

(52) U.S. Cl.
CPC ............. *B60W 30/09* (2013.01); *B60R 21/00* (2013.01); *B60T 7/12* (2013.01); *B60W 30/095* (2013.01); *G08G 1/166* (2013.01); *G08G 1/167* (2013.01)

(58) Field of Classification Search
None
See application file for complete search history.

(56) References Cited

U.S. PATENT DOCUMENTS

| | | | |
|---|---|---|---|
| 6,840,342 B1 * | 1/2005 | Hahn | 180/169 |
| 6,889,786 B2 * | 5/2005 | Watanabe et al. | 180/167 |

(Continued)

FOREIGN PATENT DOCUMENTS

| | | | | |
|---|---|---|---|---|
| EP | 2747026 A1 * | 6/2014 | | G06T 7/00 |
| JP | 2003-217099 A | 7/2003 | | |
| JP | 2008-056163 A | 3/2008 | | |

OTHER PUBLICATIONS

Aubert, Didier. Real-Time Disparity Contrast Combination for Onboard Estimation of the Visibility Distance. IEEE Transactions on Intelligent Transportation Systems, vol. 1, No. 2, Jun. 2006.*

(Continued)

*Primary Examiner* — Rami Khatib
*Assistant Examiner* — Jeffrey Boomer
(74) *Attorney, Agent, or Firm* — McDermott Will & Emery LLP

(57) ABSTRACT

A collision prevention controller mounted on a subject vehicle receives lane line information from a first environment recognizer and three-dimensional object information on a target three-dimensional object from a second environment recognizer, estimates the visual range of the driver based on the lane line information, determines whether the target three-dimensional object is located outside of the visual range of the driver, and determines the possibility of a collision of the target three-dimensional object and the subject vehicle. When the target three-dimensional object is located outside of the visual range of the driver, the collision prevention controller executes at least either one of notification to the driver or application of automatic braking in accordance with the possibility of collision with the subject vehicle.

8 Claims, 6 Drawing Sheets

(56) References Cited

U.S. PATENT DOCUMENTS

| | | | |
|---|---|---|---|
| 7,710,247 B2* | 5/2010 | Sekiguchi | 340/435 |
| 7,839,272 B2* | 11/2010 | Saito | 340/435 |
| 2004/0046866 A1* | 3/2004 | Pochmuller et al. | 348/135 |
| 2007/0030131 A1* | 2/2007 | Takahama et al. | 340/435 |
| 2009/0234553 A1* | 9/2009 | Sekiguchi | 701/96 |
| 2010/0030474 A1* | 2/2010 | Sawada | 701/301 |
| 2010/0052550 A1* | 3/2010 | Kobayashi | 315/158 |
| 2010/0253594 A1* | 10/2010 | Szczerba et al. | 345/7 |
| 2012/0212353 A1* | 8/2012 | Fung et al. | 340/905 |

OTHER PUBLICATIONS

Office Action issued in Chinese Patent Application No. 201310628655.9 dated Nov. 14, 2016, with English language translation.

* cited by examiner

VEHICLE DRIVING SUPPORT CONTROL APPARATUS

CROSS-REFERENCE TO RELATED APPLICATIONS

The present application claims priority from Japanese Patent Application No. 2012-260122 filed on Nov. 28, 2012, the entire contents of which are hereby incorporated by reference.

BACKGROUND

1. Technical Field

The present invention relates to vehicle driving support control apparatuses for executing warning and automatic braking in order to prevent a collision with a three-dimensional object in front of a vehicle.

2. Related Art

In recent years, various kinds of driving support control apparatuses for a vehicle have been developed and put into practice to detect a three-dimensional object such as a vehicle and an obstacle in front of a vehicle using a camera, a radar, and the like, and to prevent a collision with the three-dimensional object. In such driving support control apparatus, highly accurate detection of a three-dimensional object directly results in accurately performing driving support control. Therefore, for example, a vehicle surrounding monitoring apparatus disclosed in Japanese Unexamined Patent Application Publication (JP-A) No. 2003-217099 calculates the position of an object on the basis of information on a captured image, and calculates the position of the object on the basis of a reflected wave of an emitted radio wave. Then the apparatus calculates an observation position obtained as a result of observation based on both of the positions thus calculated and determines a possibility that the object in front of the vehicle comes close to the vehicle at a predetermined distance or less. When the possibility is determined to be high, the possibility is notified to the driver.

However, such vehicle driving support control apparatus for preventing collision has a big problem in the driving support technique, which is the difficulty of making determination as to execution, i.e., how to extract, present, and control necessary information when it is needed by the driver. More specifically, even if a three-dimensional object such as an obstacle in front of the vehicle is detected with a high degree of accuracy like the vehicle surrounding monitoring apparatus disclosed in JP-A No. 2003-217099 described above, there is a drawback as follows: when a danger that the driver is already well aware of is warned or controlled more than necessary, the driver becomes accustomed to such warning and control, and this may cause delay of reaction when the danger is really imminent, or the driver may be annoyed by the warning or the control and turn off the driving support function. As a result, the driving support control apparatus may not able to accomplish its function.

SUMMARY OF THE INVENTION

The present invention has been made in view of the above circumstances, and an object thereof is to provide a vehicle driving support control apparatus capable of appropriately performing collision prevention control such as notification to a driver and brake activation with regard to a three-dimensional object such as an obstacle and an on-coming vehicle that are considered not to be recognized by the driver.

A vehicle driving support control apparatus according to an aspect of the present invention includes: a first environment recognizer to detect lane line information on a of a driving lane in front, on the basis of image information; a second environment recognizer to detect information on a three-dimensional object in front, on the basis of radio wave information transmitted and received; a visual range estimator to estimate the visual range of a driver on the basis of the lane line information; a determiner to determine whether the detected three-dimensional object is located outside of the visual range of the driver; a collision possibility determiner to determine possibility of a collision between the detected three-dimensional object and the vehicle; and a collision prevention controller. to execute at least either one of notification to the driver and application of automatic braking in accordance with the possibility of a collision of the detected three-dimensional object with the vehicle when the detected three-dimensional object is located outside of the visual range of the driver.

DETAILED DESCRIPTION

Hereinafter, an example of the present invention will be described with reference to the drawings.

Figure 1:
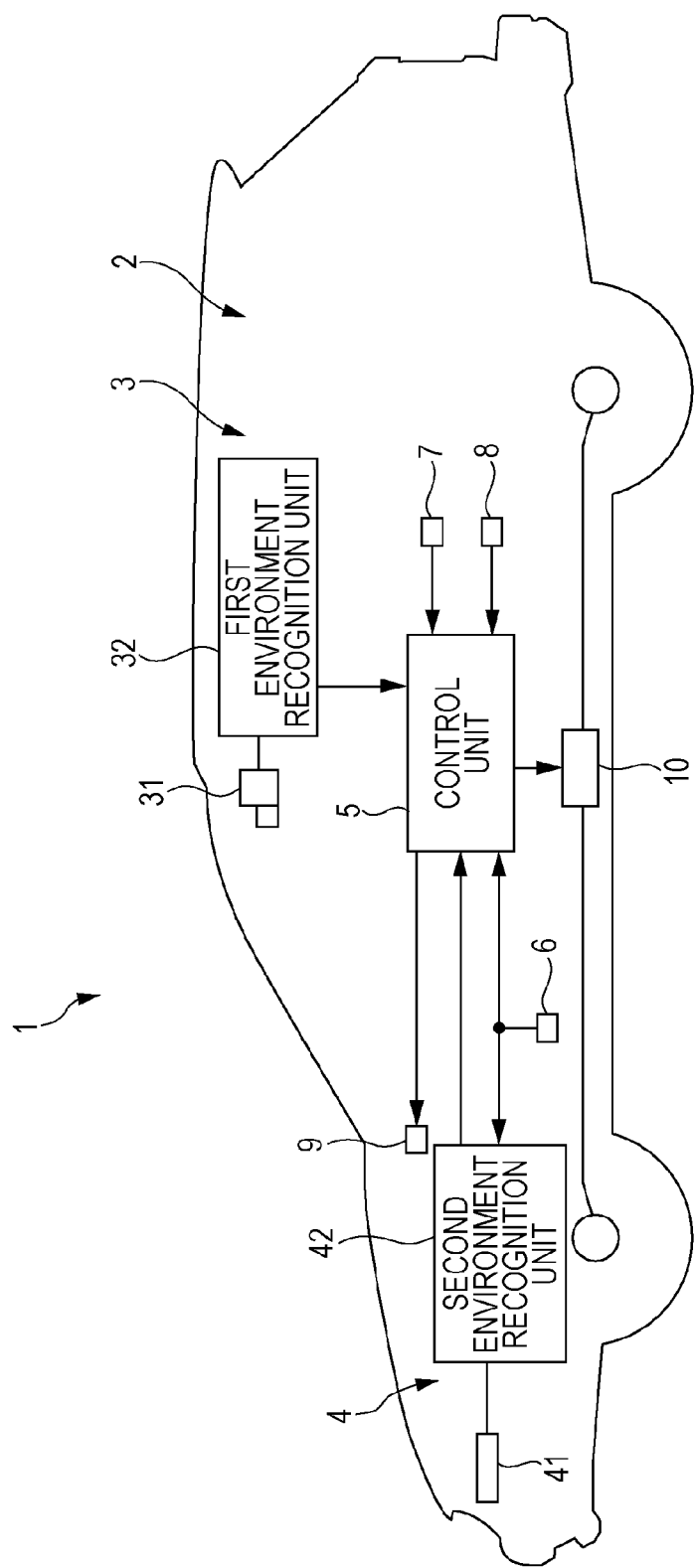
FIG. 1 is a schematic configuration diagram illustrating a vehicle driving support control apparatus mounted on a vehicle according to an example of the present invention.

In FIG. 1, a vehicle 1 such as an automobile has a driving support control apparatus 2. The driving support control apparatus 2 mainly includes a stereo camera unit 3 serving as the first environment recognizer of the present invention and a millimeter wave radar unit 4 serving as the second environment recognizer, and a control unit 5. The driving support control apparatus 2 is connected to various kinds of sensors such as a vehicle speed sensor 6 for detecting a vehicle speed V0 of the vehicle 1, a steering angle sensor 7 for detecting a steering angle θH, and a road surface μ estimating device 8 for estimating a road surface friction coefficient (road surface μ). The control unit 5 outputs a control signal to a warning lamp 9 and a brake driving unit 10 as necessary.

The stereo camera unit 3 includes a stereo camera 31 and a first environment recognition unit 32 for processing signals from the stereo camera 31.

The stereo camera 31 includes, as a stereo optical system, a pair of left and right CCD cameras having solid state imaging devices such as charge-coupled devices (CCD), for example. The CCD cameras constituting the stereo camera 31 are attached on front portions of a ceiling of a compartment of the vehicle 1 with a predetermined distance therebetween, capture images of an external object in stereo from different viewpoints, and output the captured image information to the first environment recognition unit 32. The first environment recognition unit 32 receives the image information from the stereo camera 31, and estimates the lane by recognizing lane line data in front of the vehicle and the like. The first environment recognition unit 32 processes the image information from the stereo camera 31 as follows, for example: the first environment recognition unit 32 generates distance information for a pair of right and left images (stereo images) obtained by capturing the environment ahead of the subject vehicle 1 in the traveling direction with the stereo camera 31, using a difference between corresponding positions in the images according to a principle of triangulation. The first environment recognition unit 32 first divides the reference image (for example, right image) into small regions, compares the luminance or the color pattern of each small region with that of the comparison image to find a region in the comparison image corresponding thereto and obtain a distance distribution over the entire reference image. The first environment recognition unit 32 also checks the luminance difference between adjacent pixels for each pixel on the reference image, extracts pixels having luminance differences larger than a threshold (contrast threshold) as edges, and adds distance information to the extracted pixels (edges) to generate a distribution image (distance image) of the edges having the distance information. Then, for example, the first environment recognition unit 32 performs well-known grouping processing on the distance image, and performs pattern matching with various kinds of predetermined templates, thus recognizing the lane line in front of the vehicle. This recognition of the lane line is continuously monitored over frames. When recognizing the lane line, the first environment recognition unit 32 also stores, as lane line data, the width W of the lane line from the position coordinates of the right and left lane lines and the width direction position of the vehicle 1 within the lane (the distance from the vehicle 1 to the left lane line and the distance from the vehicle 1 to the right lane line). For a lane line other than the above lane line obtained based on luminance and contrast in the image information given by the stereo camera 31, e.g., a lane line portion that is interrupted due to some reason and a lane line of the lane of the vehicle 1 estimated to be existing still farther, the first environment recognition unit 32 estimates by farther extending the lane line obtained from the image information from the stereo camera 31, thus estimating it as the coordinate data. The estimated coordinate data of the lane line may be obtained using map data and the like of a navigation system, not illustrated. Then, the lane line information on the driving lane thus obtained by the stereo camera unit 3 is output to the control unit 5.

The millimeter wave radar unit 4 includes a millimeter wave transmission reception unit 41 and a second environment recognition unit 42 for processing a signal given by the millimeter wave transmission reception unit 41.

The millimeter wave transmission reception unit 41 is provided at the front end of the vehicle 1, and is configured to transmit a predetermined millimeter wave (for example, radio wave of 30 GHz to 100 GHz) toward ahead of the vehicle, and receive the millimeter wave reflected back, thus giving the transmitted and received data to the second environment recognition unit 42.

The second environment recognition unit 42 recognizes a three-dimensional object by processing the transmitted and received data given by the millimeter wave transmission reception unit 41 as follows: the second environment recognition unit 42 measures a relative distance from the vehicle 1 to a target on the basis of a time interval between the time when the transmission wave is reflected by the target and the time when the transmission wave is returned back. Then, a portion in which the same distance value appears continuously as well as the size (the width) and the coordinate data are extracted as a piece of three-dimensional object from the distribution state of the distance values. For each three-dimensional object thus extracted, the distance from the vehicle 1 is derived, and the three-dimensional object which is the closest to the vehicle 1 is selected as a three-dimensional object against which control is to be performed (target three-dimensional object). Then, for this target three-dimensional object, the following values are calculated: a distance Lf from the vehicle 1 to the target three-dimensional object; a relative speed VOF between the vehicle 1 and the target three-dimensional object (change of distance Lf over time); a speed Vf of the target three-dimensional object (the vehicle speed V0+VOF); and a deceleration speed af. Then these pieces of the three-dimensional object information on the target three-dimensional object are output to the control unit 5.

The control unit 5 receives the lane line information on the driving lane from the first environment recognition unit 32 of the stereo camera unit 3, receives the three-dimensional object information on the target three-dimensional object from the second environment recognition unit 42 of the millimeter wave radar unit 4, receives the vehicle speed V0 from the vehicle speed sensor 6, receives the steering angle θH from the steering angle sensor 7, and receives the road surface μ from the road surface μ estimating device 8.

Then, the control unit 5 estimates the visual range of the driver based on the lane line information on the basis of the above input information, determines whether the target three-dimensional object is located outside of the visual range of the driver, and determines the possibility of a collision of the target three-dimensional object and the vehicle 1. If the target three-dimensional object is located outside of the visual range of the driver, the control unit 5 executes at least either one of notification to the driver or application of automatic braking in accordance with the possibility of a collision with the vehicle 1.

Figure 2:
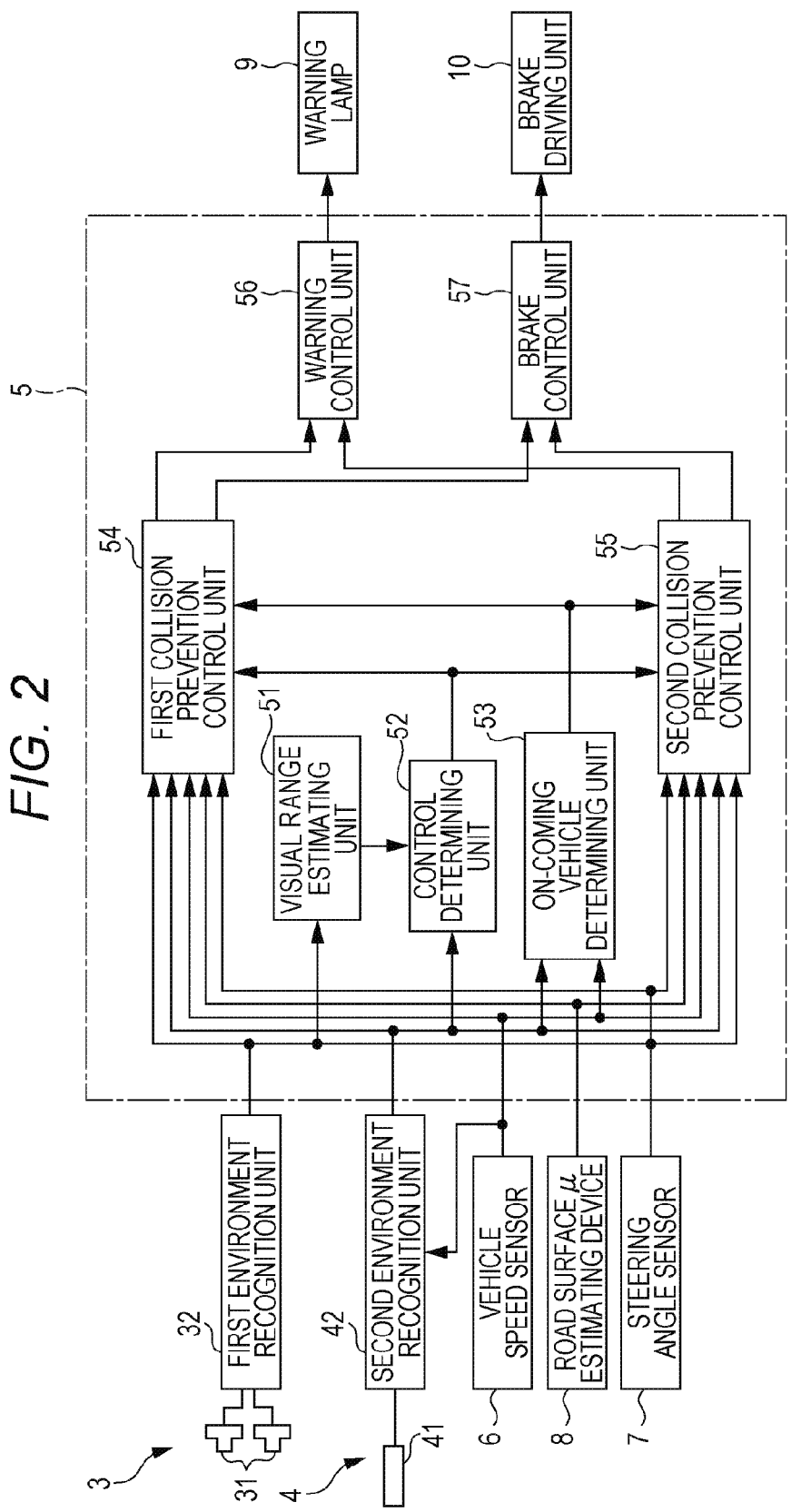
FIG. 2 is a functional block diagram illustrating a control unit according to the example of the present invention.

As illustrated in FIG. 2, the control unit 5 mainly includes a visual range estimating unit 51, a control determining unit 52, an on-coming vehicle determining unit 53, a first collision prevention control unit 54, a second collision prevention control unit 55, a warning control unit 56, and a brake control unit 57.

The visual range estimating unit 51 receives the lane line information on the driving lane from the first environment recognition unit 32, then estimates the driver's visual range Lv and outputs the driver's visual range Lv to the control determining unit 52. The driver's visual range Lv is estimated, for example, as follows: a human visual average contrast value for recognizing the lane line on the road surface is set in advance as a threshold through experiment. The visual range estimating unit 51 compares the threshold and the lane line information on the driving lane received from the first environment recognition unit 32 (distance information in front of the lane line), and the farthest distance of the lane line detected with a contrast value higher than this threshold is estimated as the driver's visual range Lv. Thus, the visual range estimating unit 51 serves as the visual range estimator of the present invention.

The control determining unit 52 receives the three-dimensional object information on the target three-dimensional object from the second environment recognition unit 42, and receives the visual range Lv of the driver from the visual range estimating unit 51. Then, if the control determining unit 52 receives a signal indicating that there is no three-dimensional object information on the target three-dimensional object from the second environment recognition unit 42, or if the control determining unit 52 determines that the distance Lf from the vehicle 1 to the target three-dimensional object is be equal to or less than the visual range Lv, the collision prevention control is not executed, and the determination result is output to the first collision prevention control unit 54 and the second collision prevention control unit 55. In other words, if there is no the target three-dimensional object in front of the vehicle 1, it is not necessary to execute the collision prevention control. If the distance Lf from the vehicle 1 to the target three-dimensional object is determined to be equal to or less than the visual range Lv, it is highly possible that the driver has already noticed the target obstacle, and the collision prevention control according to this example is not executed. Thus, the control determining unit 52 has the function of the determiner of the present invention.

The on-coming vehicle determining unit 53 receives the vehicle speed V0 from the vehicle speed sensor 6, and receives the three-dimensional object information on the target three-dimensional object from the second environment recognition unit 42. Then, the vehicle speed V0 and the speed Vf of the target three-dimensional object are compared to determine whether or not the target three-dimensional object is an on-coming vehicle, and the determination result is output to the first collision prevention control unit 54 and the second collision prevention control unit 55. In this example, determination is made as to whether or not the target three-dimensional object is an on-coming vehicle on the basis of the vehicle speed V0 received from the vehicle speed sensor 6 and the speed Vf of the target three-dimensional object received from the second environment recognition unit 42. Alternatively, determination as to whether or not the target three-dimensional object is an on-coming vehicle may be made on the basis of, for example, vehicle-to-vehicle communication if the vehicles have a vehicle-to-vehicle communication system.

The first collision prevention control unit 54 receives lane line information on the driving lane from the first environment recognition unit 32, receives the three-dimensional object information on the target three-dimensional object from the second environment recognition unit 42, receives the vehicle speed V0 from the vehicle speed sensor 6, receives the steering angle θH from the steering angle sensor 7, and receives the road surface μ from the road surface μ estimating device 8. In addition, the first collision prevention control unit 54 receives a determination result indicating whether or not the collision prevention control is to be executed from the control determining unit 52, and receives a determination result indicating whether or not the target three-dimensional object is an on-coming vehicle from the on-coming vehicle determining unit 53. Then, later-described first collision prevention control is performed according to the flowchart illustrated in FIG. 4. In the case the target three-dimensional object is a three-dimensional object on the lane of the vehicle 1, notification is given if the target three-dimensional object approaches to a distance smaller than a predetermined threshold Lal1. Specifically, a signal is output to the warning control unit 56 to, e.g., turn on the warning lamp 9, so that the possibility of collision is notified to the driver. If it is determined that the brake operation cannot be performed in time after the target three-dimensional object comes into the visual range of the driver, then a signal is output to the brake control unit 57 to activate the brake driving unit 10, so that the automatic braking is executed.

The second collision prevention control unit 55 receives the lane line information on the driving lane from the first environment recognition unit 32, receives the three-dimensional object information on the target three-dimensional object from the second environment recognition unit 42, receives the vehicle speed V0 from the vehicle speed sensor 6, receives the steering angle θH from the steering angle sensor 7, and receives the road surface μ from the road surface μ estimating device 8. In addition, the second collision prevention control unit 55 receives a determination result indicating whether or not the collision prevention control is to be executed from the control determining unit 52, and receives a determination result indicating whether or not the target three-dimensional object is an on-coming vehicle from the on-coming vehicle determining unit 53. Then, Later-described second collision prevention control is performed according to the flowchart illustrated in FIG. 5. In the case the target three-dimensional object is an on-coming vehicle, notification is given if the target three-dimensional object (on-coming vehicle) approaches to a distance smaller than the predetermined threshold Lal2. Specifically, a signal is output to the warning control unit 56 to, e.g., turn on the warning lamp 9, so that the possibility of collision is notified to the driver. If the vehicle 1 enters into the lane of the on-coming vehicle on which the on-coming vehicle drives and it is determined the brake operation cannot be performed in time due to the distance from the vehicle 1 to the on-coming vehicle, a signal is output to the brake control unit 57 to activate the brake driving unit 10, so that the automatic braking is executed. As described above, the first collision prevention control unit 54 and the second collision prevention control unit 55 are provided to have the functions of a collision possibility determiner and a collision prevention controller of the present invention.

Figure 4:
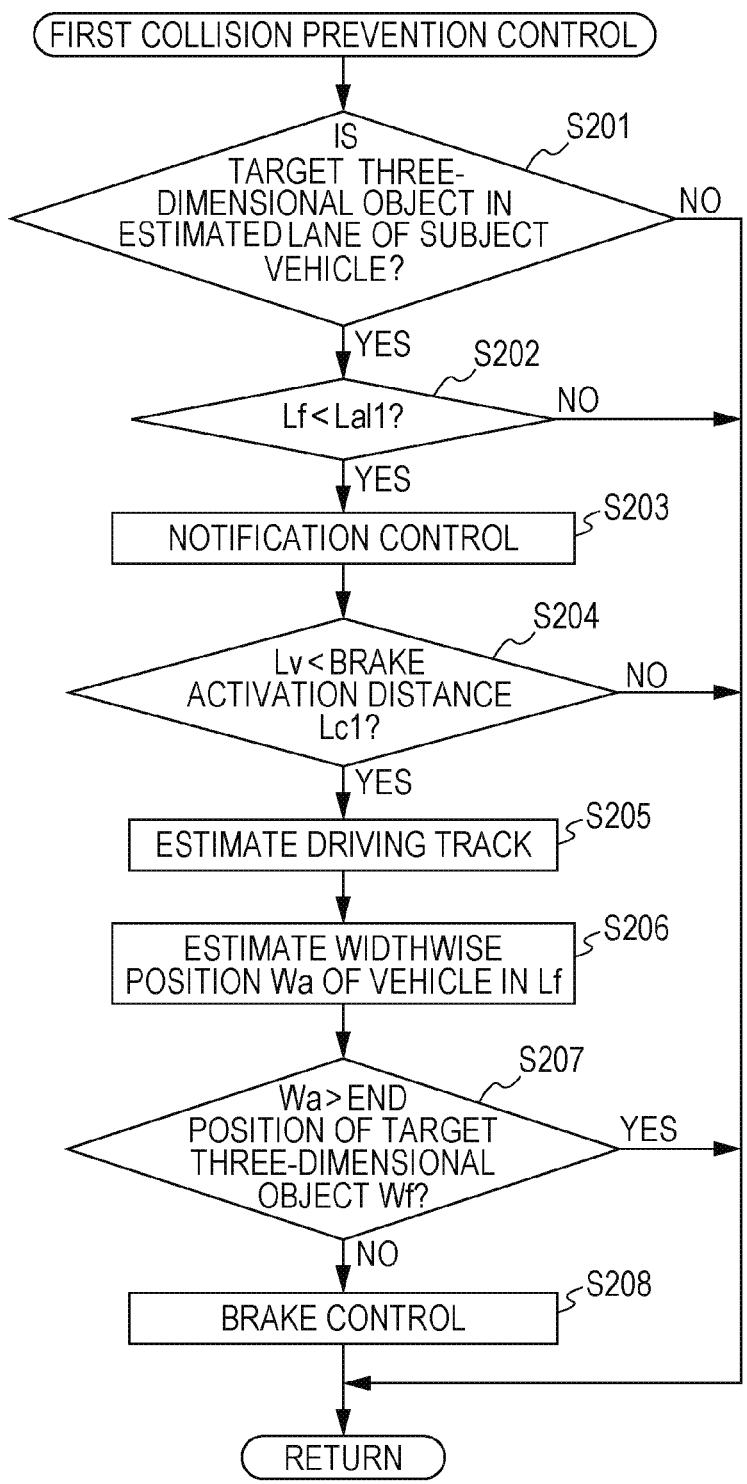
FIG. 4 is a flowchart illustrating a first collision prevention control routine according to the example of the present invention.
Figure 5:
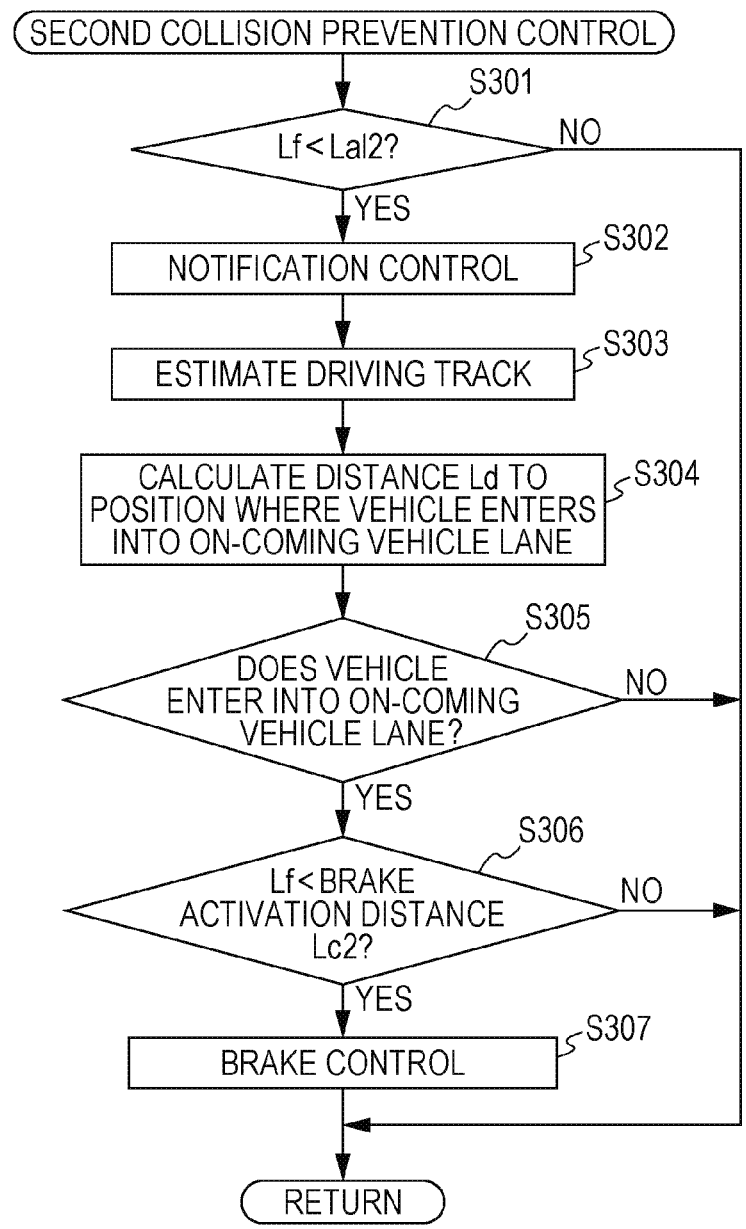
FIG. 5 is a flowchart illustrating a second collision prevention control routine according to the example of the present invention.

Subsequently, the vehicle driving support control executed by the control unit 5 configured as described above will be described with reference to the flowchart of FIGS. 3 to 5.

Figure 3:
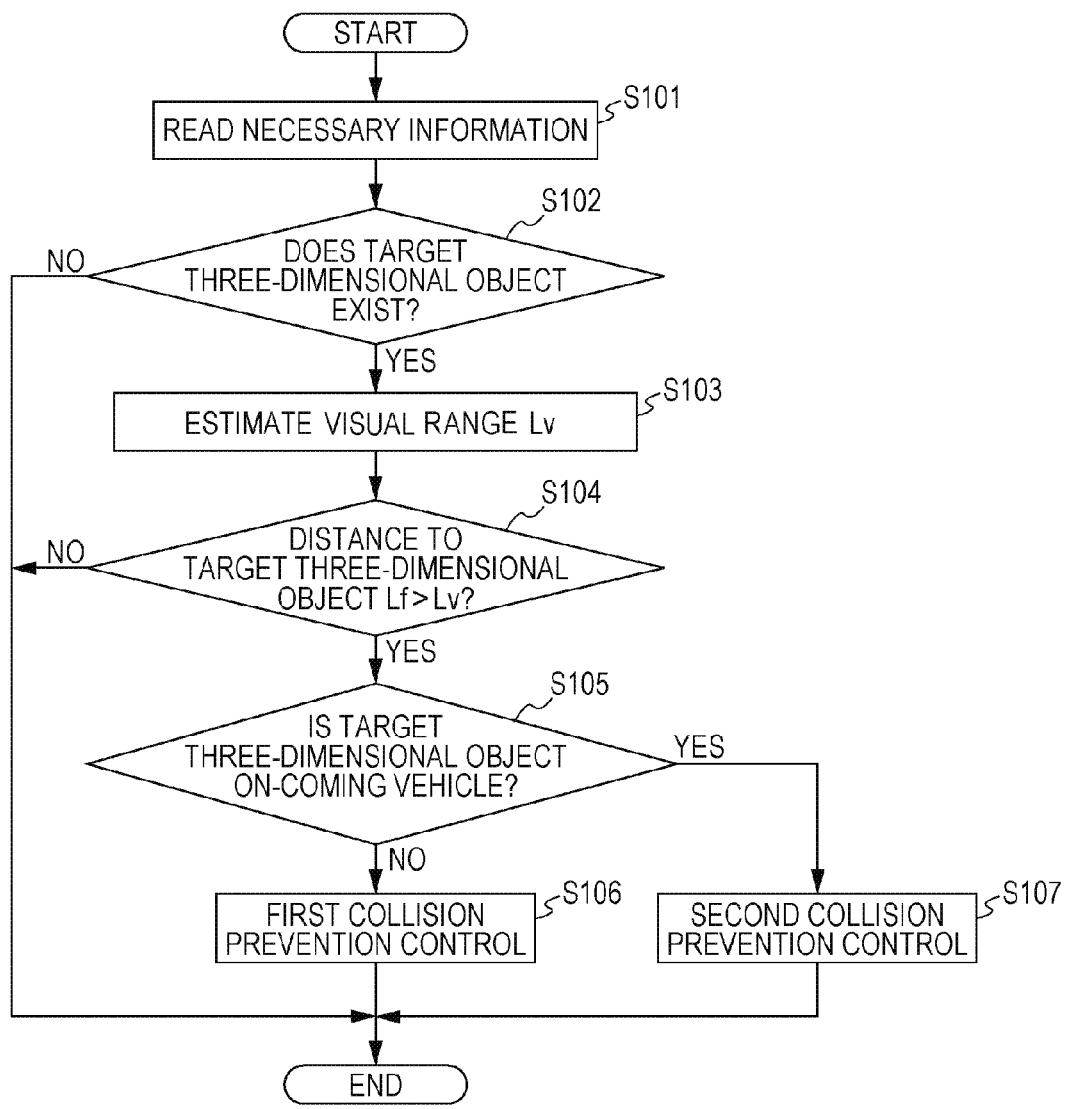
FIG. 3 is a flowchart illustrating a vehicle driving support control program according to the example of the present invention.

FIG. 3 illustrates the entire program of the vehicle driving support control. In step (hereinafter abbreviated as "S") 101, necessary information is read. The necessary information includes the lane line information on the driving lane, the three-dimensional object information on the target three-dimensional object, the vehicle speed V0, the steering angle θH, and the road surface μ.

Then the program proceeds to S102, where the control determining unit 52 determines whether there is three-dimensional object information in front of the vehicle. If there is no target three-dimensional object in front of the vehicle, it is not necessary to execute the collision prevention control, and therefore, the program is exited without any further processing. If there is three-dimensional object information ahead, the flow program to S103.

In S103, as described above, the driver's visual range Lv is as follows: for example, a human visual average contrast value for recognizing the lane line on the road surface is set in advance as a threshold through experiment. The visual range estimating unit 51 compares the lane line information on the driving lane received from the first environment recognition unit 32 (distance information in front of the lane line) and the threshold, and the farthest distance of the lane line detected with a contrast value higher than this threshold is estimated as the driver's visual range Lv.

In following S104, the control determining unit 52 compares the distance Lf to the target three-dimensional object and the visual range Lv. If the distance Lf to the target three-dimensional object is determined to be equal to or less than the visual range Lv, it is highly possible that the driver has already noticed the target obstacle. Accordingly, it is determined that the collision prevention control according to this example need not be executed, and the program is exited without any further processing. If the distance Lf to the target three-dimensional object is longer than the visual range Lv, the processing is performed as follows. If there is no target three-dimensional object does in the visual range of the driver, and it is highly possibly that driver has not noticed the target obstacle, then the program proceeds to S105. More specifically, if the collision prevention control is performed for a target obstacle that the driver has already noticed, warning and control is made as respect to a danger that the driver is already well aware of is more than necessary, whereby the driver becomes accustomed to such warning and control. As a result, a delay may be caused in the driver's reaction when the danger is really imminent, or the driver may feel that the warning or the control are annoying, and turn off the driving support function itself, which may result in inability to achieve the original function of the driving support control apparatus. Therefore, the driving support control apparatus 2 according to this example is configured to perform the collision prevention control for a target three-dimensional object that driver is considered not to be able to recognize because it is out of the driver's visual range.

In S105, as described above, the on-coming vehicle determining unit 53 determines whether or not is an on-coming vehicle. If the target three-dimensional object is not an on-coming vehicle, the program proceeds to S106 to execute the first collision prevention controls, and the program is exited. If the target three-dimensional object is an on-coming vehicle, the program proceeds to S107 to execute the second collision prevention control, and the program is exited.

S106, where the first collision prevention control is executed by the first collision prevention control unit 54, will be described with reference to FIGS. 4 and 6.

First, in S201, a determination is made as to whether the target three-dimensional object is located in the lane of the vehicle that is estimated as described above by the first environment recognition unit 32. If the target three-dimensional object does is not located in the lane of the vehicle which is estimated as a result of the determination in step S201, it is not necessary to execute the collision prevention control, and therefore, the routine is exited without any further processing. If the target three-dimensional object is located in the lane of the vehicle which is estimated as a result of the determination in step S201, the routine proceeds to S202, where the distance Lf from the vehicle 1 to the target three-dimensional object and the predetermined threshold Lal1 are compared. The predetermined threshold Lal1 is, for example, a distance value obtained by multiplying the vehicle speed V0 and a certain predetermined inter-vehicle time THWc set (Lal1=V0·THWc).

Then, if the distance Lf from the vehicle 1 to the target three-dimensional object is equal to or greater than the predetermined threshold Lal1 (Lf≥Lal1) as a result of the comparison in S202, it is determined that warning need not be given to the driver, and the routine is exited without any further processing. If the distance Lf from the vehicle 1 to the target three-dimensional object is smaller than the predetermined threshold Lal1 (Lf<Lal1), the routine proceeds to S203, where a signal is output to the warning control unit 56 to, e.g., turn on the warning lamp 9, so that the possibility of collision is notified to the driver.

Thereafter (after S203), the routine proceeds to S204, where the visual range Lv and the predetermined brake activation distance Lc1 advance are compared. In this case, the brake activation distance Lc1 is, for example, a distance calculated by the expression (1) as follows:

$$Lc1 = V0F^2/(2 \cdot \Delta a0) \tag{1}$$

where, $\Delta a0$ denotes a relative deceleration speed that can be controlled by the vehicle 1, and is a difference between the deceleration speed of the target three-dimensional object and the maximum deceleration speed of the vehicle 1 that is set by calculation (or by looking up a map and the like) in accordance with the road surface μ. If the visual range Lv is equal to or greater than the predetermined brake activation distance Lc1 (Lv≥Lc1), the driver himself/herself can cope with the target three-dimensional object when the target three-dimensional object comes into the visual range Lc1, and therefore, the routine is exited without any further processing. If the visual range Lv is smaller than the predetermined brake activation distance Lc1 (Lv<Lc1), it is determined that the brake operation cannot be performed in time after the target three-dimensional object comes into the visual range of the driver, and therefore, the routine proceeds to S205.

Figure 6:
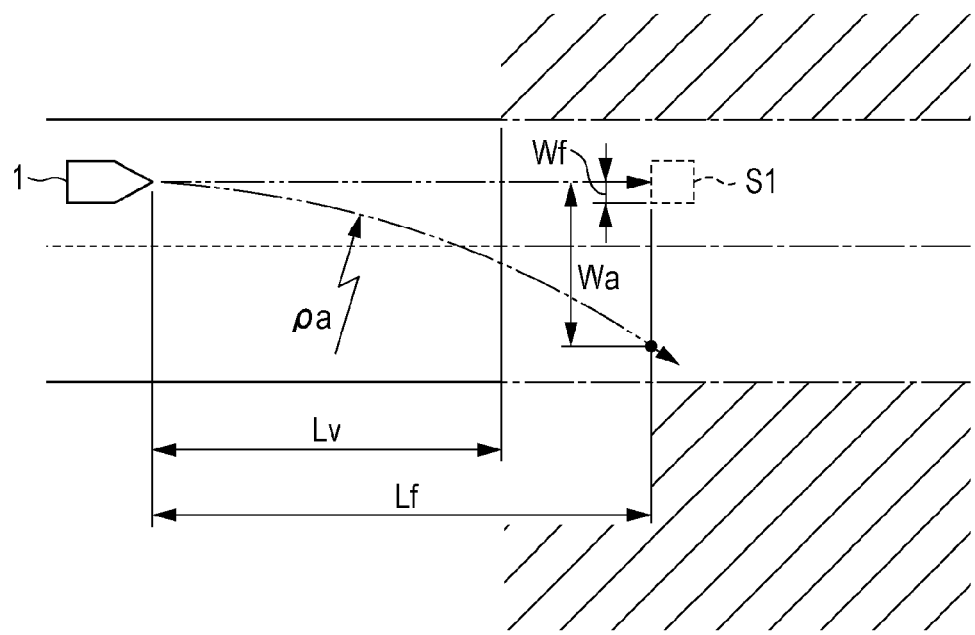
FIG. 6 is a view describing a first collision prevention control according to the example of the present invention.

In S205, as illustrated in FIG. 6, the driving track of the vehicle 1 is estimated on the basis of the vehicle speed V0 and the steering angle θH, by approximation using the driving path of a turning radius ρa according to the following expression (2), for example:

$$\rho a = (1 + A \cdot V0^2) \cdot 1 \cdot n/\theta He \tag{2}$$

where, A denotes steering characteristics, 1 denotes a wheel base, n denotes a steering gear ratio, and θHe denotes a steering angle predicted value. In FIG. 6, the target three-dimensional object is denoted with S1. The steering angle predicted value θHe is calculated, for example, by the following expression (3):

$$\theta He = \theta H + (d\theta H/dt) \cdot \Delta t \tag{3}$$

where, (dθH/dt) denotes a steering angle speed, and Δt denotes a predicted time.

Thereafter, the routine proceeds to S206, where, on the basis of the turning radius ρa of the driving track of the vehicle 1 estimated in S205, the widthwise position Wa of the vehicle 1 in the distance Lf from the vehicle 1 to the target three-dimensional object is estimated, for example, by the following expression (4):

$$Wa = \rho a - \rho a \cdot \sin(\cos^{-1}(Lf/\rho a)) \tag{4}$$

Then the routine proceeds to S207, and where widthwise position Wa of the vehicle 1 in the distance Lf from the vehicle 1 to the target three-dimensional object and the widthwise position Wf at the end of the target three-dimensional object are compared. When Wa is greater than Wf (Wa>Wf), the driver is determined to be executing a collision avoidance operation, and the routine is exited without any further processing.

If Wa is equal to or less than Wf (Wa≤Wf), the driver is determined not to be executing a collision avoidance operation, and the routine proceeds S208, where a signal is output to the brake control unit 57 to activate the brake driving unit 10, so that the automatic braking is executed. Then the routine is exited.

As described above, according to the first collision prevention control of this example, when the target three-dimensional object is a three-dimensional object in the lane of the vehicle 1, then notification is given as follows: if the target three-dimensional object approaches to a distance smaller than the predetermined threshold Lal1, a signal is output to the warning control unit 56 to, e.g., turn on the warning lamp 9, so that the possibility of collision is notified to the driver. If it is determined that the brake operation cannot be performed in time after the target three-dimensional object comes into the visual range of the driver, a signal is output to the brake control unit 57 to activate the brake driving unit 10, so that the automatic braking is executed. As a result, with regard to a target three-dimensional object the driver is considered not to be able to truly recognize, the collision prevention control such as notification and brake activation can be appropriately performed for the driver.

S107 of the flowchart of the vehicle driving support control program of FIG. 3, i.e., the second collision prevention control executed by the second collision prevention control unit 55 will be described with reference to FIGS. 5 and 7.

First, in S301, the distance Lf from the vehicle 1 to the target three-dimensional object and the predetermined threshold Lal2 are compared. In this case, the predetermined threshold Lal2 is, for example, a distance value obtained by multiplying the vehicle speed V0 and a certain predetermined time Tc (Lal2=V0·Tc).

Then, if the distance Lf from the vehicle 1 to the target three-dimensional object is equal to or greater than the predetermined threshold Lal2 (Lf≤Lal2) as a result of the comparison in S301, it is determined that warning need not be given to the driver, and the routine is exited without any further processing. If the distance Lf from the vehicle 1 to the target three-dimensional object is smaller than the predetermined threshold Lal2 (Lf<Lal2), the routine proceeds to S302, where a signal is output to the warning control unit 56 to, e.g., turn on the warning lamp 9, so that the possibility of collision with the on-coming vehicle is notified to the driver.

Figure 7:
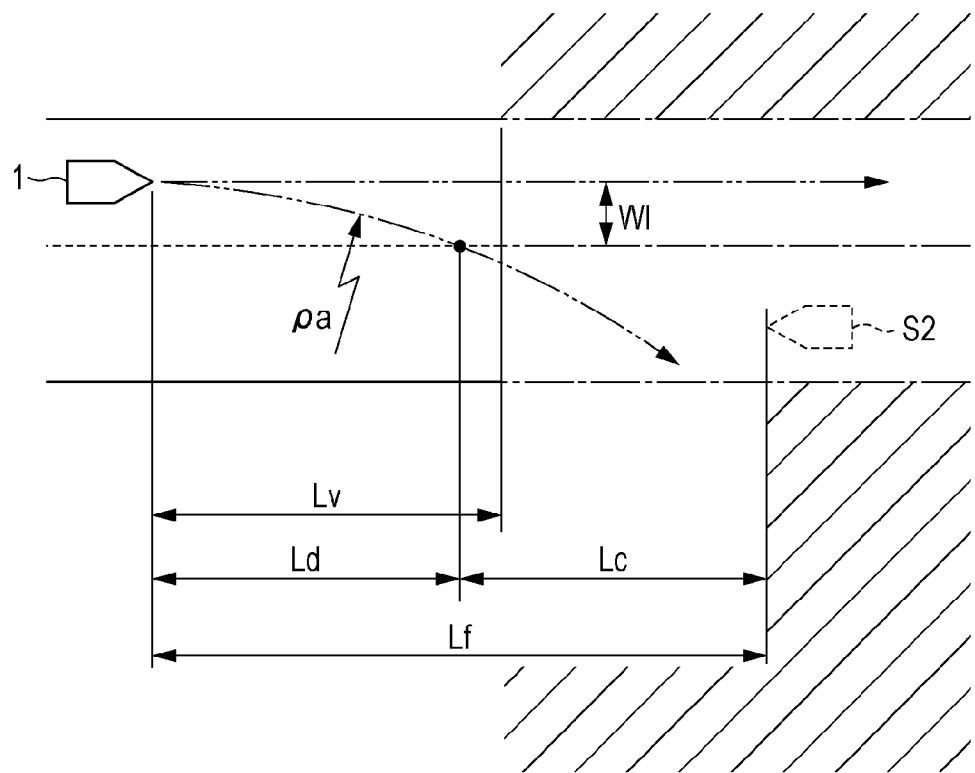
FIG. 7 is a view describing a second collision prevention control according to the example of the present invention.

Then, the routine proceeds to S303, where, as illustrated in FIG. 7, the driving track of the vehicle 1 is estimated on the basis of the vehicle speed V0 and the steering angle θH, by approximation using the driving path of a turning radius pa according to the above expression (2), for example. In FIG. 7, the on-coming vehicle is denoted as S2.

Then, the routine proceeds to S304, and where, on the basis of the turning radius pa of the driving track estimated in S303 and the width direction distance W1 of the vehicle 1 to the on-coming vehicle lane, the distance Ld of the vehicle 1 to a point where the vehicle 1 enters into the on-coming vehicle lane is calculated, for example, by the following expression (5):

$$Ld=\rho a \cdot \cos(\sin^{-1}((\rho a-W1)/\rho a)) \quad (5)$$

Then, the routine proceeds to S305 is performed, where the distance Lf from the vehicle 1 to the target three-dimensional object and the distance Ld of the vehicle 1 to a point where the vehicle 1 enters into the on-coming vehicle lane are compared, and a determination as to whether Ld<Lf i.e., whether the vehicle 1 enters into a position ahead of the on-coming vehicle driving in the on-coming vehicle lane.

If Ld≥Lf as a result of the determination in S305, the on-coming vehicle has already passed the position where the vehicle 1 enters into the on-coming vehicle lane, and it is considered that the collision of the vehicle 1 and the on-coming vehicle can be avoided. Accordingly, the routine is exited without any further processing.

If Ld<Lf, the vehicle 1 enters into a position ahead of the on-coming vehicle driving in the on-coming vehicle lane, and the vehicle 1 may collide therewith. Therefore, the routine proceeds to S306.

In S306 the distance Lf from the vehicle 1 to the target three-dimensional object (=Ld+Lc, where Lc is the distance from the point where the vehicle 1 enters into the on-coming vehicle lane to the on-coming vehicle) and the predetermined brake activation distance Lc2 are compared. In this case, Lc2 is derived from the following expression (6), for example:

$$Lc2=Ld+VOF^2/(2 \cdot \Delta ac) \quad (6)$$

where, $\Delta ac$ is the maximum deceleration speed of the vehicle 1, and is set by calculation (or by looking up a map and the like) in accordance with the road surface μ.

If the distance Lf from the vehicle 1 to the target three-dimensional object (=Ld+Lc) is equal to or greater than the predetermined brake activation distance Lc2 (Lf≥Lc2) as a result of determination of S306, it is determined that the vehicle 1 and the on-coming vehicle will not collide with each other, and the routine is exited without any further processing. If the distance Lf from the vehicle 1 to the target three-dimensional object (=Ld+Lc) is smaller than the predetermined brake activation distance Lc2 (Lf<Lc2), it is determined that the vehicle 1 is highly likely to collide with the on-coming vehicle driving the on-coming vehicle lane which is out of visual range, and the routine proceeds to S307, where a signal is output to the brake control unit 57 to activate the brake driving unit 10, so that the automatic braking is executed. Then the routine is exited.

As described above, according to the second collision prevention control of this example, when the target three-dimensional object is an on-coming vehicle, then notification is given as follows: if the distance between the target three-dimensional object (on-coming vehicle) and the vehicle 1 is smaller than the predetermined threshold Lal2, a signal is output to the warning control unit 56 to, e.g., turn on the warning lamp 9, so that the possibility of collision is notified to the driver. If it is determined that the brake operation cannot be performed in time due to the distance from the vehicle 1 to the on-coming vehicle when the vehicle 1 enters into the lane of the on-coming vehicle where the on-coming vehicle is driving, a signal is output to the brake control unit 57 to activate the brake driving unit 10, so that the automatic braking is executed. As a result, with regard to the on-coming vehicle which the driver is considered not to be able to truly recognize, the collision prevention control such as notification and brake activation can be appropriately performed for the driver.

In the example of the present invention, lane line detection and visual range setting are made on the basis of the image information given by the stereo camera unit 3. Alternatively, lane line detection and visual range setting may be made on the basis of image information given by a single lens camera unit or a color camera unit. In this example, the second environment recognition unit is configured to detect three-dimensional object information using radio wave information given by the millimeter wave radar. Alternatively, three-dimensional object information may be detected using optical wave information given by a laser radar.

The invention claimed is:

1. A vehicle driving support control apparatus comprising:
   a first environment recognition unit, including a camera, to detect lane line information on a driving lane in front of a host vehicle on which the vehicle driving support control apparatus is disposed, based on an image obtained by the camera;
   a second environment recognition unit, including a radar, to detect three-dimensional object information including a distance from the host vehicle to a three-dimensional object in front of the host vehicle, a relative speed between the host vehicle and the three-dimensional object, and a speed of the three-dimensional object, based on an electromagnetic wave signal obtained by the radar; and
   a controller configured to execute:
      presetting a threshold as an average contrast value by which a human vision can recognize a lane line;
      obtaining a visual distance that is a farthest distance of the lane line detected by the first environment recognition unit with the contrast value higher than the preset threshold;
      determining whether or not a three-dimensional object is an on-coming vehicle based on a vehicle speed of the host vehicle and the speed of the three-dimensional object which is detected by the second environment recognition unit;
      determining whether the three-dimensional object detected by the second environment recognition unit is located outside of the obtained visual distance based on the lane line information by comparing a distance to the three-dimensional object detected by the second environment recognition unit and the obtained visual distance;
      determining a possibility of a collision between the host vehicle and the detected three-dimensional object based on the detected three-dimensional object information by the second environment recognition unit and based on determination whether the detected three-dimensional object is located in lane lines detected by the first environment recognition unit; and
      when the detected three-dimensional object is located further than the obtained visual distance, outputting a warning signal to cause a warning apparatus to make a notification to the driver in a case where the possibility of a collision is less than a first threshold and an automatic brake signal for application of automatic braking in a case where the possibility of a collision is less than a second threshold, wherein:
      a possibility of a collision for the second threshold is higher than a possibility of a collision for the first threshold, and
      when the controller determines that the three-dimensional object is the on-coming vehicle, and when the controller recognizes that the host vehicle is going to enter into an on-coming vehicle lane on which the on-coming vehicle drives, the controller outputs the automatic braking signal in accordance with a distance from the host vehicle to the on-coming vehicle.

2. The vehicle driving support control apparatus according to claim 1, wherein when the distance between the three-dimensional object and the host vehicle becomes smaller than a predetermined threshold, the controller outputs the warning signal.

3. The vehicle driving support control apparatus according to claim 2, wherein in the case that the three-dimensional object is a three-dimensional object in a lane of the host vehicle, the controller outputs the automatic brake signal when it is determined that a brake operation cannot be performed in time after the three-dimensional closer than the obtained visual distance.

4. The vehicle driving support control apparatus according to claim 3, wherein the controller estimates a driving track of the host vehicle, and does not output the automatic braking signal if the estimated driving track is for avoiding the three-dimensional object on the lane of the host vehicle.

5. The vehicle driving support control apparatus according to claim 2, wherein when the three-dimensional object is an on-coming vehicle, and the host vehicle enters into the on-coming vehicle lane on which the on-coming vehicle drives, the controller outputs the automatic braking signal in accordance with a distance from the host vehicle to the on-coming vehicle.

6. The vehicle driving support control apparatus according to claim 1, wherein in the case that the three-dimensional object is a three-dimensional object in a lane of the host vehicle, the controller outputs the automatic brake signal when it is determined that a brake operation cannot be performed in time after the three-dimensional object comes closer than the visual distance of the driver.

7. The vehicle driving support control apparatus according to claim 6, wherein the controller estimates a driving track of the host vehicle, and does not output the automatic braking signal if the estimated driving track is for avoiding the three-dimensional object on the lane of the host vehicle.

8. The vehicle driving support control apparatus according to claim 1, wherein when the three-dimensional object is an on-coming vehicle, and the host vehicle enters into the on-coming vehicle lane on which the on-coming vehicle drives, the controller outputs the automatic braking signal in accordance with a distance from the host vehicle to the on-coming vehicle.

* * * * *